United States Patent
Lee

(10) Patent No.: US 7,313,076 B2
(45) Date of Patent: Dec. 25, 2007

(54) METHOD OF SETTING OPTIMUM RECORDING POWER IN OPTICAL RECORDING APPARATUS

(75) Inventor: Young-woo Lee, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 548 days.

(21) Appl. No.: 10/899,071

(22) Filed: Jul. 27, 2004

(65) Prior Publication Data

US 2005/0052969 A1    Mar. 10, 2005

(30) Foreign Application Priority Data

Sep. 5, 2003    (KR) .................... 10-2003-0062178

(51) Int. Cl.
G11B 7/00    (2006.01)

(52) U.S. Cl. ...................... 369/116; 369/47.5

(58) Field of Classification Search ................. 369/116, 369/120, 121, 122, 47.5, 47.51, 47.53, 47.52
See application file for complete search history.

(56) References Cited

U.S. PATENT DOCUMENTS 6,480,448 B1 * 11/2002 Kawano et al. ............ 369/47.5
6,577,571 B2 *  6/2003 Takeda et al. ............ 369/47.53
7,023,773 B2 *  4/2006 Park ........................ 369/47.53

FOREIGN PATENT DOCUMENTS

JP    2000-137918     5/2000
KR    000055628      9/2000
KR    2002-21006     3/2002

OTHER PUBLICATIONS

Notice to Submit Response issued by the Korean Intellectual Property Office in Application No. 10-2003-0062178 on Jul. 25, 2005.

* cited by examiner

*Primary Examiner*—Nabil Hindi
(74) *Attorney, Agent, or Firm*—Staas & Halsey LLP

(57) ABSTRACT

A method of and apparatus for setting optimum recording power using characteristic values calculated inversely from recording power that allows a recordable optical disc to have a minimum value of jitter. The method includes setting a first optimum recording power value using characteristic values of an RF signal detected from an optical disc, and recording a predetermined pattern on the optical disc while changing the first recording power value; measuring a value of jitter according to the recorded pattern, and setting a recording power value when a minimum value of jitter is obtained as a second optimum recording power value; inversely calculating the characteristic values from the second optimum recording power value; and setting a third optimum recording power value using the inversely calculated characteristic values. Accordingly, it is possible to improve recording and reproducing qualities of optical discs that have the same time information and ID but their writing/reading speeds and media are different.

11 Claims, 5 Drawing Sheets

$$\beta = \frac{A-B}{A+B} \quad \begin{cases} A=(\text{PEAK HOLD}-\text{AVERAGE}) \\ B=(\text{AVERAGE}-\text{BOTTOM HOLD}) \end{cases}$$

$\gamma$ = VALUE OBTAINED BY NORMALIZING
  (PEAK HOLD VALUE−BOTTOM HOLD VALUE)
  BY VALUE OF RF SIGNAL $\beta = aP_{optimum} + b$

METHOD OF SETTING OPTIMUM RECORDING POWER IN OPTICAL RECORDING APPARATUS

CROSS-REFERENCE TO RELATED APPLICATIONS

This application claims the priority of Korean Patent Application No. 2003-62178 filed on Sep. 5, 2003 in the Korean Intellectual Property Office, the disclosure of which is incorporated herein in its entirety by reference.

BACKGROUND OF THE INVENTION

1. Field of the Invention

The present invention relates to a method of operating an optical recording apparatus, and more particularly, to a method of setting the optimum recording power using characteristic values calculated inversely from a recording power level that allows a recordable optical disc to have a minimum value of jitter.

2. Description of the Related Art

Development of recordable discs has resulted in advances in the technologies of storage media such as an optical disc. The recordable discs include a compact disc recordable/rewritable (CD-R/RW) and a digital versatile disc recordable/rewritable (DVD±R/RW).

Unlike read-only optical discs, use of the recordable discs requires complicated recording algorithms. That is, the level of the recordable disc technologies is higher than that of the read-only disc technologies. For instance, levels of the recording power must be defined to record data on a recordable disc. The recording power influences recording and reproducing qualities, and thus, standards of recording power have been prescribed. However, in fact, it is impossible to indiscriminately set recording power since the recording power is determined by the performance of an optical disc and a recording apparatus. For this reason, during a write operation, the recording apparatus detects and uses an optimum recording power for an optical disc. A method of detecting the optimum recording power is standardized, which is referred to as optimum power control (OPC).

Optimum power control will now be described briefly. In general, information regarding reference recording power is described in a region of an optical disc, e.g., a lead-in region, and a recording apparatus performs a test for detecting the optimum recording power in a particular region or section of the optical disc based on the information. The test for detecting the optimum recording power is referred to as power calibration (PC), and the particular region or section where PC is performed is referred to as a power calibration area (PCA). In other words, the recording apparatus performs the test a predetermined number of times to obtain its optimum recording power that is also fit for the type of an optical disc. In general, in the test, values of the recording power are stored in the PCA from the bottom level upward or vice versa. Then the test values are reproduced and a recording power value, allowing a desired reproduction quality, is selected and set as the optimum recording power.

FIG. 1A illustrates a region of a CD-RW where optimum power control is performed. In detail, a PCA is positioned before a lead-in region formed in an inner part of the CD-RW, and divided into a PCA test section and a PCA count section. Before performing a write operation, a recording apparatus checks the PCA count section to detect the PCA test section. Next, the recording apparatus performs power calibration for optimum recording power in a predetermined part, e.g., 15 sectors, of the detected PCA test section. After power calibration, the result of power calibration is marked in the PCA count section so that it can be referred to in a next write operation, thereby making it easy to detect the PCA test section in a next write operation.

FIG. 1B illustrates a region of a DVD±R/RW, which has a higher recording density than a CD-RW, where optimum power control is performed. Referring to FIG. 1B, there is an unused part of a PCA that is an inner part of the DVD±R/RW, a size of the unused part ranges from 1 sector to several tens of sectors. In the case of the DVD±R/RW, test data recorded in the PCA is reproduced and radio-frequency (RF) processed to obtain an RF signal, characteristic values of the RF signal are calculated, and optimum power control is performed using the characteristic values. Optimum recording power of the DVD±R is detected using a value $\beta$ that indicates a degree of asymmetry of the RF signal, and the optimum recording power of the DVD±RW is detected using a value $\gamma$ obtained by differentiating a modulation value or modulation characteristics of the RF signal. However, the value $\beta$ and the modulation value may vary according to a media manufacturer, the type of an optical disc, or conditions of a pickup of a disc drive performing a write operation. Accordingly, during a manufacture process, a media manufacturer tests an optical disc to measure the value $\beta$ and the modulation value (or the value $\gamma$) and stores them in a table in firmware in the optical disc, so that optimum power control can be performed using time information or an identifier (ID) read from the optical disc and the values stored in the table.

However, as optical discs that have the same time information or ID but have different writing/reading speeds or media, come onto the market, it is difficult to set optimum recording power for various types of optical discs using the value $\beta$ and the modulation value.

SUMMARY OF THE INVENTION

An aspect of the present invention provides a method of setting the optimum recording power using characteristic values calculated inversely from a value of recording power that allows a recordable optical disc to have a minimum jitter value.

Additional aspects and/or advantages of the invention will be set forth in part in the description which follows and, in part, will be obvious from the description, or may be learned by practice of the invention.

According to an aspect of the present invention, there is provided a method of setting optimum recording power for an optical recording apparatus, including setting a first optimum recording power value using characteristic values of an RF signal detected from an optical disc, and recording a predetermined pattern on the optical disc while changing the first optimum recording power value; measuring a value of jitter according to the recorded pattern, and setting a recording power value when a minimum value of jitter is obtained as a second optimum recording power value; inversely calculating the characteristic values from the second optimum recording power value; and setting a third optimum recording power value using the inversely calculated characteristic values.

According to another aspect, the method includes storing the inversely calculated characteristic values in a predetermined area of the optical disc.

According to another aspect, the first optimum recording power is changed by a predetermined step of $\pm\alpha$.

According to another aspect, while being inversely calculated, the characteristic values vary according to a type of the optical disc.

According to an aspect of the present invention, a value β is inversely calculated from the second optimum recording power when the optical disc is a DVD±R, the value β being one of the characteristic values and indicating a degree of asymmetry of the RF signal.

According to an aspect of the present invention, a value γ is inversely calculated from the optimum recording power when the optical disc is a DVD±RW, the value γ being one of the characteristic values and obtained by differentiating modulation of the RF signal.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
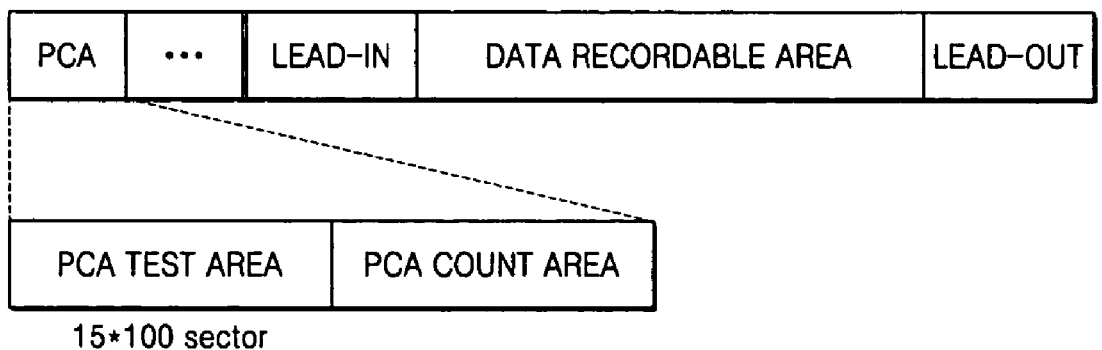
FIGS. 1A and 1B illustrate a test area of an optical disc using a conventional method of setting the optimum recording power using an optical recording apparatus.
Figure 1B:
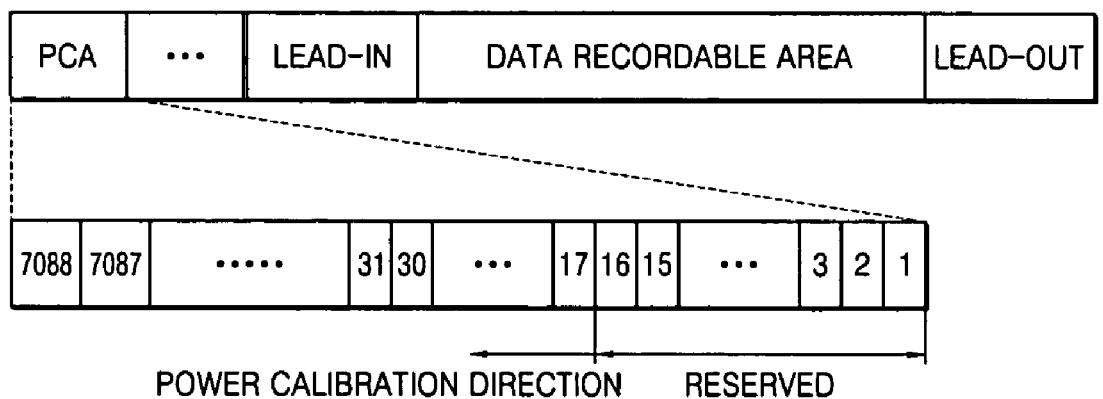

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
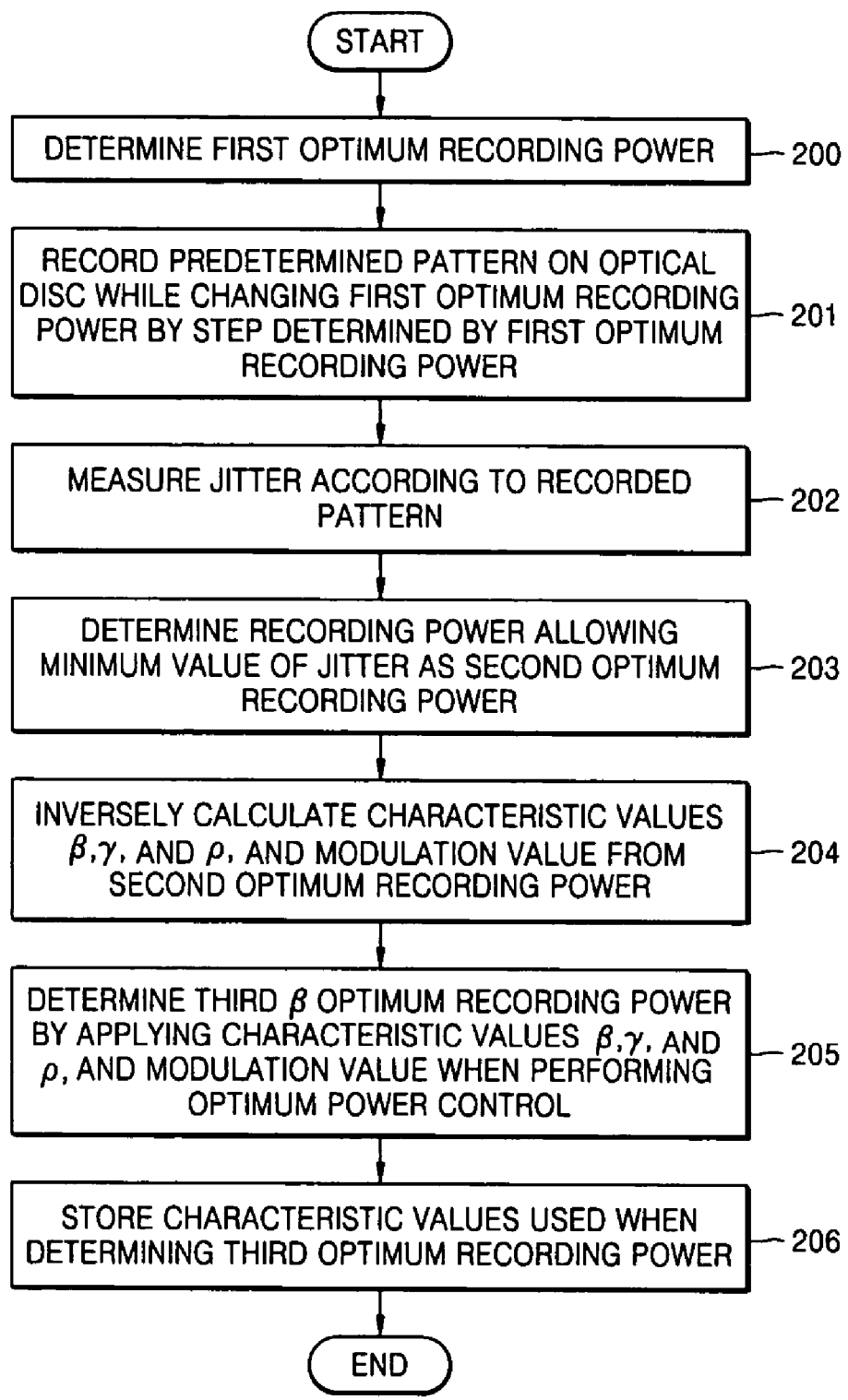
FIG. 2 is a flowchart illustrating a method of setting an optimum recording power using an optical recording apparatus, according to an embodiment of the present invention.

FIG. 2 is a flowchart illustrating a method of setting optimum recording power using an optical recording apparatus, according to an embodiment of the present invention. The method of FIG. 2 includes determining a value of a first optimum recording power using optimum power control 200, recording a predetermined pattern on a disc while changing the first recording power value by a step determined by the first optimum recording power value, measuring jitter according to the recorded pattern 202, determining a value of recording power obtained when a minimum value of jitter is obtained as a second optimum recording power value 203, calculating characteristic values, such as a value β, a modulation value, a value γ, and a value ρ, inversely from the second recording power value 204, determining a third recording power value by applying the characteristic values when performing optimum power control 205, and storing the characteristic values used when determining the third optimum recording power value 206.

Figure 3A:
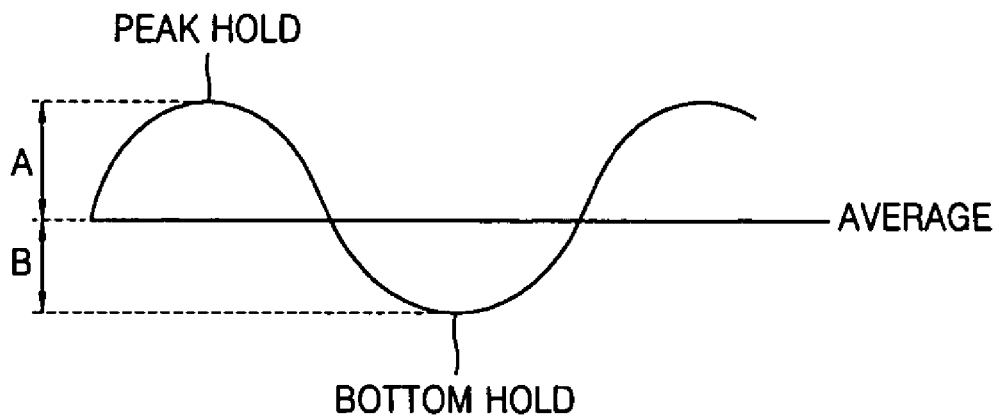
FIGS. 3A through 3D are graphs illustrating the method of FIG. 2.
Figure 3B:
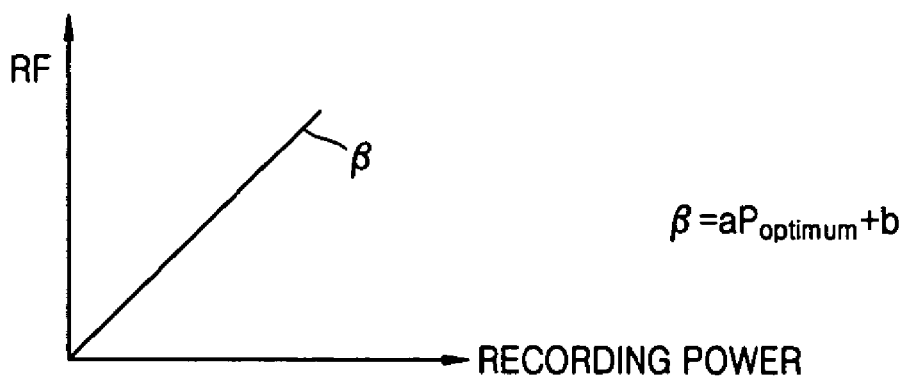
Figure 3C:
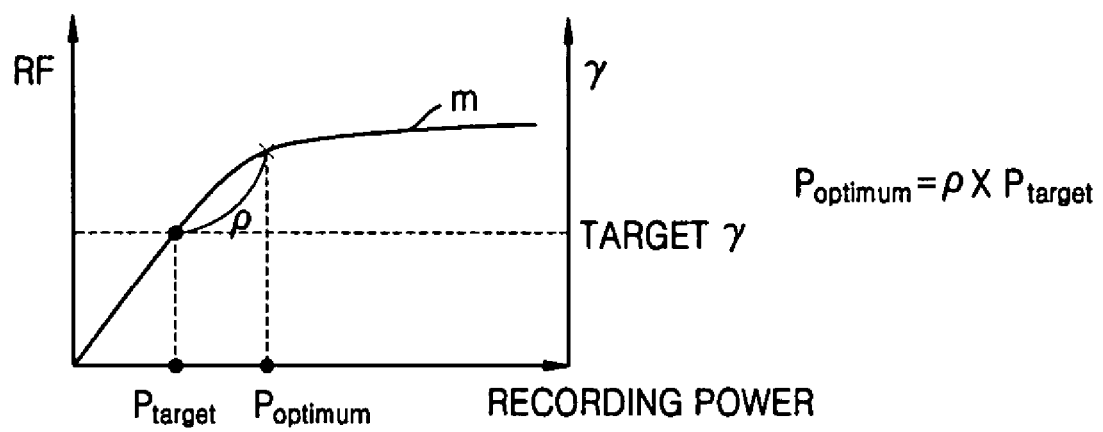
Figure 3D:
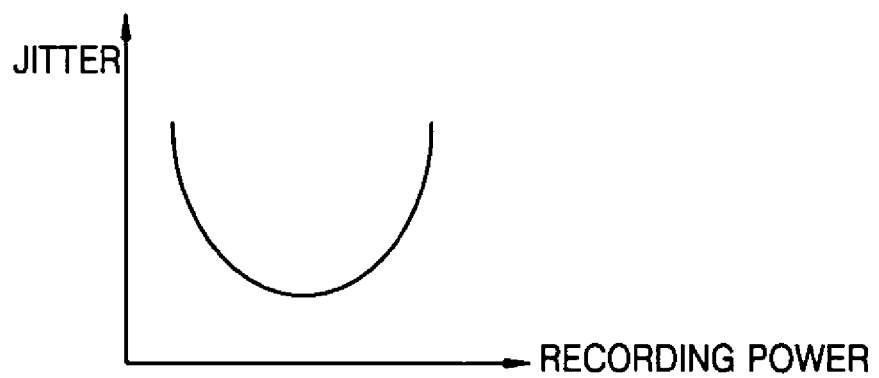

FIGS. 3A through 3D are graphs illustrating the method of FIG. 2. In detail, FIG. 3A is a waveform diagram of the RF signal used for optimum power control. FIG. 3B is a graph illustrating the relations between values of the RF signal and values of the recording power for a DVD±R. FIG. 3C is a graph illustrating the relations between values of the RF signal and values of the recording power for a DVD±RW. FIG. 3D is a graph illustrating the relations between values of jitter and values of the recording power.

A method of setting an optimum recording power using an optical recording apparatus according to an embodiment of the present invention will now be described with reference to FIGS. 2 and 3A-3D.

In this method, the optimum recording power is set by a system controller, described in more detail later, of the optical recording apparatus. In this disclosure, the construction and operation of the optical recording apparatus are well known to those ordinary skilled in the art, and thus, a description thereof will be omitted.

Referring to FIG. 2, the optical recording apparatus determines a first optimum recording power value to set an optimum recording power value in operation 200. Since the optimum recording power value may vary according to the type of an optical disc, the optical recording apparatus performs optimum power control according to the type of an optical disc.

When the optical disc is a DVD±R, the controller sequentially reads test data from a power calibration area (PCA) of the optical disc, converts the test data into an RF signal, and calculates a value β indicating a degree of asymmetry of the RF signal. As illustrated in FIG. 3A, the value β is calculated by (A−B)/(A+B), using a peak hold value, bottom hold value, and average value of the RF signal. Here, A denotes a value obtained by subtracting the average value from the peak hold value, and B denotes a value obtained by subtracting the bottom hold value from the average value. Also, as shown in FIG. 3B, values of the RF signal are in direct proportion to values of the recording power and their relation can be expressed as an equation of $\beta = aP_{optimum} + b$. In this equation, since β is an already known value and a and b are constants, it is possible to calculate an optimum recording power value $P_{optimum}$ using these values. The optimum recording power value $P_{optimum}$ is determined as a value of the first optimum recording power.

When the optical disc is a DVD±RW, the controller sequentially reads test data from a PCA of the optical disc, converts the test data into an RF signal, measures a value of modulation of the RF signal that represents signal amplitude, and calculates a value γ by differentiating the modulation. As illustrated in FIG. 3A, the value γ is calculated by normalizing the difference between a peak hold value and bottom hold value of the RF signal by values of the RF signal. That is, the value γ is obtained by differentiating modulation values of the RF signal. In this case, the relation between the RF signal values and the recording power values can be expressed as $P_{optimum} = \rho \times P_{target}$ as shown in FIG. 3C. In other words, when a value of the recording power is small, the amplitude of the RF signal is small and its modulation is also small. When a value of the recording power is large, the amplitude of the RF signal is large and its modulation becomes large. When the recording power has a predetermined value, the modulation is saturated. Because recording using the saturation recording power obtained when saturation of the modulation begins causes few errors, the saturation recording power is set to the optimum recording power $P_{optimum}$. A target value of the value γ has been stored in the DVD±RW during a disc manufacture process. A target recording power value $P_{target}$ corresponds to the target value of the value γ and is illustrated by FIG. 3C. The recording power obtained when saturation of the modulation begins can be calculated using the equation of $P_{optimum} = \rho \times P_{target}$. In the equation, ρ denotes an offset value of the optical disc. Optical discs have their own offset values. The recording power $P_{optimum}$ is determined as the first optimum recording power.

After operation 200, the controller records a predetermined pattern in the PCA of the optical disc while changing the first recording power value by a predetermined step $\pm\alpha$ determined by the first recording power in operation 201. A range of the first optimum recording power, i.e., the predetermined step, varies within a predetermined range.

Next, the controller reproduces the pattern recorded in the PCA and measures a jitter value in the reproduced pattern in operation 202. The jitter value is measured by a jitter measurement unit (not shown) that is installed inside or outside the controller.

Next, the controller determines a recording power value obtained when a minimum value of the jitter is measured, as the second optimum recording power in operation 203.

FIG. 3D is a graph illustrating the relation between the jitter values and the recording power values which is obtained using a second order equation. Referring to FIG. 3D, the value of the recording power corresponding to a minimum value of the jitter is determined as the second optimum recording power.

After determining the second optimum recording power value, the controller calculates characteristic values $\beta$, $\gamma$, $\rho$, and a modulation value inversely from the second optimum recording power value in operation 204. A method of calculating the characteristic values is determined by the type of the optical disc.

If the optical disc is the DVD±R, the value $\beta$ is obtained by the reverse calculation. More specifically, as described with reference to FIG. 3B, the RF signal values are in direct proportion to the recording power values and their relation is expressed as the equation of $\beta=aP_{optimum}+b$. In the equation, $P_{optimum}$ denotes the second optimum recording power value that has already been calculated and a and b are constants. Therefore, it is possible to calculate the value $\beta$ from these values.

If the optical disc is the DVD±RW, since the second optimum recording power value $P_{optimum}$ is already known, it is possible to inversely calculate characteristic values, such as the modulation value, and values $\gamma$ and $\rho$, from the relation between the RF signal values and the recording power values illustrated by FIG. 3C.

After obtaining the characteristic values, the controller determines a third optimum recording power value by applying the characteristic values when performing optimum power control in operation 205.

If the optical disc is the DVD±R, as shown in FIG. 3B, the RF signal values are in direct proportion to the recording power values and their relation is expressed as the equation of $\beta=aP_{optimum}+b$. Since $\beta$ is an already known value and a and b are constants, the third optimum recording power value $P_{optimum}$ can be calculated using these values.

If the optical disc is the DVD±RW, the RF signal values are in direct proportion to the recording power values as shown in FIG. 3C. That is, when a value of the recording power is small, the amplitude of the RF signal is small and its modulation is also small. When a value of the recording power is large, the amplitude of the RF signal is large and its modulation becomes large. When the recording power has a predetermined value, the modulation is saturated. Since recording using a recording power value obtained when saturation of the modulation begins causes few errors, the recording power value is set to the optimum recording power value $P_{optimum}$. The optimum recording power value $P_{optimum}$ obtained when saturation of the modulation begins is calculated by the equation of $P_{optimum}=\rho\times P_{target}$ as shown in FIG. 3C. Here, since $\rho$ and $P_{target}$ are already known values, it is possible to calculate the third optimum recording power $P_{optimum}$ using these values. The third optimum recording power $P_{optimum}$ is finally determined as an optimum recording power value.

Upon determining the third optimum recording power $P_{optimum}$, the controller stores the inversely calculated characteristic values in the PCA or a record management area (RMA) of the optical disc in operation 206. The stored characteristic values are used as reference values when performing optimum power control later.

Figure 4:
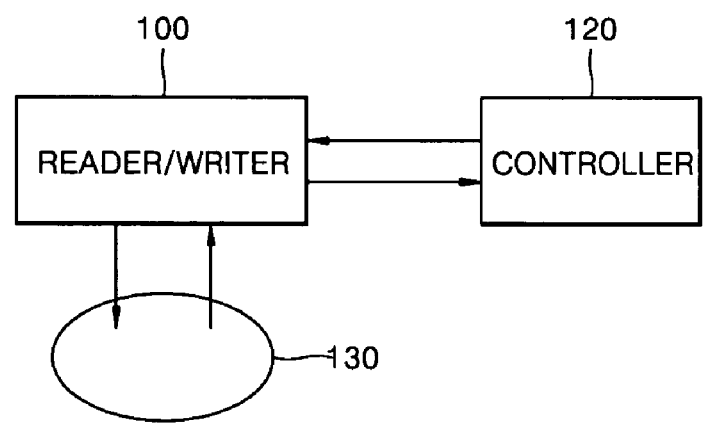
FIG. 4 is a block diagram of an apparatus for recording/reproducing information to/from an information storage medium according to an embodiment of the present invention.

FIG. 4 is a block diagram of an optical recording and/or reproducing apparatus in which the method of FIG. 2 is performed. Referring to FIG. 4, the recording and/or reproducing apparatus includes a writer/reader unit 100 and a controller 120. The reader/writer unit 100 reads from and writes to the information storage medium 130 according to commands from the controller 120.

Figure 5:
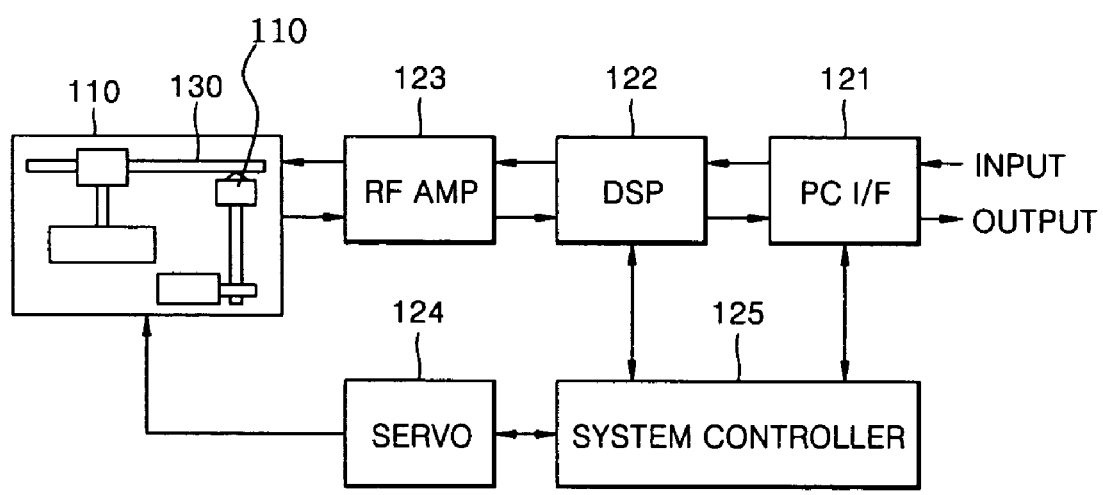
FIG. 5 is a more detailed block diagram of the recording and/or reproducing apparatus of FIG. 4.

FIG. 5 is a more detailed block diagram of the optical recording and/or reproducing apparatus of FIG. 4. Referring to FIG. 5, the information storage medium 130 is loaded in the reader/writer unit 100. The reader/writer unit 100 includes an optical pickup 110 that reads from and writes to the information storage medium 130. The recording and/or reproducing apparatus further includes a PC I/F 121, a DSP 122, an RF AMP 123, a servo 124, and a system controller 125, all of which constitute the controller 120 of FIG. 4.

When an information storage medium 130 is loaded into the optical recording and/or reproducing apparatus, the PC I/F 121 receives a recording command together with data to be recorded, from a host (not shown). The system controller 125 performs the initialization necessary for recording, such as determining an OPC. More specifically, the system controller 125 reads out information necessary for initialization, such as, disk-related information stored in a lead-in area of an information storage medium 130, and prepares for recording based on the read-out information. The system controller uses the read-out information to determine a type of the information storage medium, i.e., DVD±R, DVD±RW. Based on the determined type of information storage medium, the system controller determines the optimum recording power according to the method of FIG. 2 as described above. The DSP 122 performs ECC encoding on the data to be recorded that is received from the PC I/F 121 by adding data such as parity to the received data, and then modulates the ECC-encoded data in a specified manner. The RF AMP 123 converts the data received from the DSP 122 into an RF signal. The pickup 110 records the RF signal received from the RF AMP 123 to the information storage medium 130. The servo 124 receives a command necessary for servo control from the system controller 125 and servo-controls the pickup 110. If the information storage medium 130 stores no reproducing speed information, the system controller 125 commands the pickup 110 to write the reproducing speed information to a specified area of the information storage medium 130 when recording starts, while recording is being executed, or after recording has been completed.

During reproduction, the PC I/F 121 receives a reproduction command from the host (not shown). The system controller 125 performs the initialization necessary for reproduction. When the initialization is completed, the system controller 125 reads out reproducing speed information recorded on the information storage medium 130 and performs reproduction at a reproducing speed corresponding to the read-out reproducing speed information. The pickup 110 projects a laser beam onto the information storage medium 130, receives a laser beam reflected by the information storage medium 130, and outputs an optical signal. The RF AMP 123 converts the optical signal received from the pickup 110 into an RF signal, supplies modulated data obtained from the RF signal to the DSP 122, and supplies a servo control signal obtained from the RF signal to the servo 124. The DSP 122 demodulates the modulated data and outputs data obtained through ECC error correction. The servo 124 receives the servo control signal from the RF AMP 123 and a command necessary for servo control from the system controller 125 and servo-controls the pickup 110. The PC I/F 121 sends data received from the DSP 122 to the host (not shown).

As described above, according to the present invention, optimum recording power is set using characteristic values calculated from a recording power value that allows a recordable optical disc to have a minimum value of jitter. Accordingly, it is possible to improve recording and reproducing qualities of optical discs that have the same time information and ID but their writing/reading speeds and media are different.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of setting optimum recording power of an optical recording and/or reproducing apparatus, comprising:
   setting a first optimum recording power value using characteristic values of an RF signal detected from an optical disc, and recording a predetermined pattern on the optical disc while changing the first optimum recording power value;
   measuring a value of jitter according to the recorded pattern, and setting a recording power value when a minimum value of jitter is obtained as a second optimum recording power value;
   calculating the characteristic values from the second optimum recording power value inversely; and
   setting a third optimum recording power value using the inversely calculated characteristic values from the second optimum recording power value,
   wherein the characteristic values comprise at least one of a value $\beta$ which indicates a degree of asymmetry of the RF signal, a modulation value, a value $\gamma$ which is obtained by differentiating modulation of the RF signal, and a value $\rho$ which denotes an offset value of the optical disc.

2. The method of claim 1, further comprising:
   storing the inversely calculated characteristic values from the second optimum recording power value in a predetermined area of the optical disc.

3. The method of claim 1, wherein the first optimum recording power is changed by a predetermined step of $\pm\alpha$ during the recording of the predetermined pattern.

4. The method of claim 1, wherein when inversely calculating the characteristic values from the second optimum recording power value, the characteristic values vary according to a type of the optical disc.

5. The method of claim 4, wherein the value $\beta$ is calculated from the second optimum recording power when the optical disc is a DVD±R.

6. The method of claim 4, wherein the value $\gamma$ is inversely calculated from the second optimum recording power when the optical disc is a DVD±RW.

7. A method of setting optimum recording power of an optical disc used in an optical recording and/or reproducing apparatus, comprising:
   determining a first optimum recording power value according to a type of the optical disc;
   recording a predetermined pattern on the optical disc while varying the first optimum recording power value within a range;
   reproducing the recorded predetermined pattern from the optical disc and measuring corresponding jitter;
   determining a second optimum recording power value as corresponding to a minimum value of the jitter during the reproducing of the recorded predetermined pattern;
   calculating first characteristic values and a modulation value inversely from the second optimum recording power value; and
   determining a third optimum recording power value based on the inversely calculated first characteristic values and the modulation value from the second optimum recording power value according to the type of the optical discs,
   wherein the first characteristic values comprise at least one of $\beta$ indicating a degree of asymmetry of an RF signal from the optical disc, $\gamma$ obtained by differentiating modulation of the RF signal, and $\rho$ indicating an offset value of the optical disc.

8. The method of claim 7, wherein when the type of the optical disc is DVD±R, the determining the first optimum recording power value comprises:
   reading test data from a power calibration area of the optical disc;
   converting the test data into an RF signal;
   calculating a second characteristic value $\beta$ indicating a degree of asymmetry of the RF signal; and
   calculating the first optimum recording power value based on the second characteristic value $\beta$.

9. The method of claim 8, wherein the determining the third optimum recording power value comprises calculating the third optimum recording power value according to the calculated first characteristic values.

10. The method of claim 7, wherein when the type of the optical disc is DVD±RW, the determining the first optimum recording power value comprises:
    reading test data from a power calibration area of the optical disc;
    converting the test data into an RF signal;
    measuring a value of modulation of the RF signal;
    calculating a second characteristic value $\gamma$ by differentiating the modulation value; and
    calculating the first optimum recording power value based on the second characteristic value $\gamma$ and an offset value $\rho$ specific to the optical disc.

11. The method of claim 10, wherein the determining the third optimum recording power value comprises calculating the third optimum recording power value according to the calculated first characteristic values and the modulation value.

* * * * *